Figure 1:
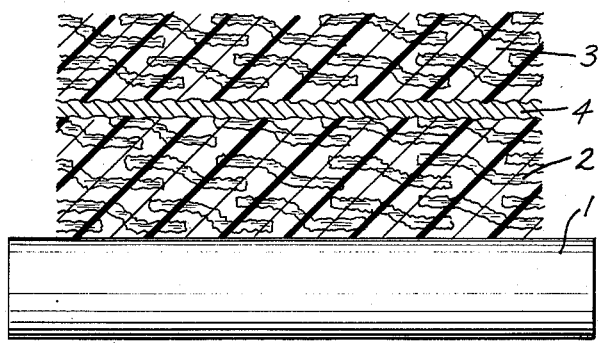

Nov. 26, 1963 A. IMHOF 3,112,357
CRACK FREE INSULATED CONDUCTORS AND METHOD OF MANUFACTURE
Filed March 31, 1958

INVENTOR.
Alfred Imhof
BY
Michael J. Striker cc# 3,112,357
CRACK FREE INSULATED CONDUCTORS
AND METHOD OF MANUFACTURE
Alfred Imhof, Winzerstr. 67, Zurich 49, Switzerland
Filed Mar. 31, 1958, Ser. No. 725,407
Claims priority, application Switzerland Mar. 30, 1957
20 Claims. (Cl. 174—121)

The present invention relates to laminated coverings and to a method of making the same and, more particularly, the present invention relates to a laminated covering of high electrical insulating properties for use in electrical apparatus and the like.

Laminated coverings have already been applied to electrical apparatus, particularly to members having a straight axis such as cylindrical bodies and primarily to high voltage conductors. This was done by forming a laminated body from smooth papers such as kraft paper layers which were combined by means of synthetic resins so as to form a laminated body. Condensation resins and solvent-free impregnating and adhesive resins such as epoxy resins and unsaturated polyesters or thermoplastic resins were primarily used to adhere the individual kraft paper layers to each other.

However, it was found that even laminated layers of relatively small thickness could not be produced in the above manner so as to be completely crack-free. Cracks are formed by partial disengagement of successive layers. For instance, in the case of cylindrical tube-like laminated coverings, the cracks have in a plane perpendicular to the axis of the laminated tube generally a moon-shaped cross-section. The width of such cracks may in extreme cases amount to several millimeters or it may be so small that it can only be seen under considerable optical enlargement (so-called hairline cracks). When it is desired to use such laminated coverings for electrotechnical insulating purposes, for instance for high voltage wall tube insulations (high voltage bushings), then these cracks cause serious difficulties. The air contained therein may become ionized and break-downs are easily formed. Particularly, such laminated insulations are not resistant to impulse stresses (voltage pulses). The above described crack formation is well known for instance in connection with so-called hard paper (laminated paper) tubes of relatively large radial thickness and in the case of larger hard paper (bakelized paper) condenser bushings.

The above described difficulties do not only occur in connection with hard paper insulations but also in connection with all other synthetic materials which may be used for forming insulating coverings, even in the case of impregnations with paraffin or with compound masses.

It is, therefore, an object of the present invention to overcome the aforementioned difficulties in the manufacture of and with respect to laminated insulating coverings and the like.

It is another object of the present invention to provide a laminated covering which will not be subject to crack formation and which can be produced in a simple and economical manner.

It is a further object of the present invention to provide a method whereby it is possible to produce laminated crack-free coverings at great speed and without requiring the application of pressure and, during the superposition of the individual layers of the laminated body, the application of heat.

Other objects and advantages of the present invention becomes apparent by a further reading of the description and of the appended claims.

With the above and other objects in view, the present invention mainly consists in a method of forming a laminated covering on a solid body, comprising the steps of applying under tension to at least a portion of the surface of a solid body a plurality of superposed layers of crepe paper, supplying to these layers a synthetic hardenable resin so as to substantially impregnate these layers and fill the spaces between these layers, the steps of applying the layers and supplying the resin being carried out in any desired sequence, and hardening the hardenable resin thereby forming a laminated covering consisting essentially of layers of crepe paper impregnated with and adhesively adhered to each other by the hardened synthetic resin.

The present invention also includes as an article of manufacture a laminated body comprising, in combination, a plurality of layers of tensioned crepe paper and a hardened synthetic resin substantially completely impregnating the layers and filling all interstices so as to form a crack-free laminated body.

Thus, according to the present invention, it is now possible to overcome in a surprisingly simple manner the above described disadvantages by using in place of the previously applied types of paper a crepe paper, the crimping or creping of which is at least partially retained when the same is superposed so as to form part of the laminated structure. In this manner, according to the present invention, it is possible to produce coverings of great wall thickness particularly in connection with high voltage apparatus, insulating tubes, bushing insulations and the like which are completely free of cracks of any size. The laminated body can be formed with the help of an auxiliary mandrel about which the crepe paper is wound and which is later removed.

Without limiting the present invention to any specific explanation or theory for the underlying causes, it can be assumed that probably the laminated structure is retained in crack-free condition on the one hand, due to the elasticity of the crepe paper in tangential direction and, on the other hand, due to the radial meshing of resin and crepe paper.

It has been found that particularly good results are obtained with commercial types of crepe paper which are crimped in such a manner that the possible tensioning due to crimping or creping amounts to between about 10 and 50% of the original length. However, even the use of crepe papers which can be stretched only to a lesser extent, will have results which are far superior to those obtainable with smooth papers.

Laminated bodies, according to the present invention, are preferably formed of crepe paper webs of considerable width or also of narrower crepe paper bands. However, such laminated body can also be formed of crepe paper sheets or pieces such as may, for instance, be cut from a crepe paper web and which are so cut or chosen as to correspond to the size and configuration of the desired laminated body.

As hardenable synthetic resins primarily those are to be considered, according to the present invention, which are free of solvents and which harden irreversibly without splitting off volatile constituents.

Particularly, so-called low pressure resins such as epoxy-resins and the resins which belong to the group of unsaturated polyesters have been found to give good results, according to the present invention. The use of these latter resins is connected with the great advantage, particularly in the case of high voltage installations, which must be free of pores or blisters, that the laminated body can be produced without application of pressure and—when cold hardening resins are applied—the hardening can be carried out without appreciable supply of heat.

Furthermore, poly-condensation resins, preferably phenol-formaldehyde and cresol-formaldehyde resins which can be solidified by hardening and which can be applied in a manner known per se, can be advantageously used. When it is desired to produce pore-free coverings with these latter resins, then they must be worked up under application of pressure and heat and therefore slightly prehardened resins are preferred.

Furthermore, unsaturated simple polymerizable so-called monomeric or oligomeric substances may be used, such as styrene or methacrylic acid esters which are transformed into the solid state by polymerization. The last named substances have the particular advantage of being thin liquids and, consequently, they are especially suitable for the subsequent impregnation of a laminated body consisting of superposed crepe paper layers.

In addition, thermoplastic materials may be used as hardenable synthetic resins, according to the present invention, provided that the thermoplastic materials will become solidified by being cooled to the operating temperature of the laminated body, i.e. to the highest temperature to which the laminated body might be exposed after installation. Such thermoplastic materials can be used which are of sufficiently liquid consistency at temperatures which are still too low to adversely affect the crimping of the crepe paper.

The following example of hardenable resins which may be used, according to the present invention, is given as illustrative only, the invention, however, not being limited to the specific resins mentioned therein.

EXAMPLE 1

Epoxy resins which may be used, according to the present invention, are for instance mixtures of materials containing poly-epoxide with a 1,2-epoxy equivalency greater than one, produced for instance from polyhydric phenols or polyhydric alcohols and halohydrins (excluding fluorine compounds) and a hardener.

As starting materials for preparing poly-epoxides may be used, for instance:

Polyhydric phenols—
    Resorcinol
    Hydroquinone
    Pyrocatechol
    Saligenin
    Phloroglicinol
    4,4'-dihydroxy-diphenyl-dimethyl-methane
    4,4'-dihydroxy-biphenyl
    4,4'-dihydroxy-diphenyl-sulfone
    4,4'-dihydroxy-diphenyl-methane
    Trihydroxy-diphenyl-dimethyl-methane
    Polyhydric naphthalenes
    Novolac resins
Polyhydric alcohols—
    Glycerol
    Ethylene glycol
    2,3-butanediol
    Erythritol
    Sorbitol
    Trimethylene glycol
    Diglycerol
Halohydrins—
    Epichlorohydrin
    Dichlorohydrin
    Epibromohydrin epihalohydrins of mannitol, sorbitol, erythrol.

The preparation of such poly-epoxides is, for instance, described in the following U.S. patents:

| | |
|---|---|
| 2,324,483 | 2,582,985 |
| 2,444,333 | 2,592,560 |
| 2,467,171 | 2,665,266 |
| 2,538,072 | 2,521,911 |
| 2,558,949 | | and in the following British patents:

746,824
726,830

The poly-epoxides may also be formed of compounds containing double bonds, such as: esters of oleic and linolic acids with glycerine, crosslinked polybutadiene rubber (which contains terminal and internal olefin groups) epoxidized with peracetic acid.

The preparation of these compounds is, for instance, described in: Fitzgerald et al., "Epoxy-Polybutadiene Resins," Electronic Equipment, July 1956, and in U.S. patents:

2,485,160
2,569,502
2,458,484
2,567,930

These products are, for instance, available under the following trade names:

Epon-Resin of Shell Chemical Co.;
Epi-Rez of John Dabney Co.;
Araldite of Ciba Co., Inc.;
Bakelite ERL–2774, ERL–3794, ERL–2795.

The above described poly-epoxides can be transformed into hard thermoset solids by the following methods:

(1) By direct linkage between epoxy groups and hydroxyl groups with catalysts such as tertiary amines and Friedel-Crafts type catalysts; for instance as described in U.S. patents:

2,553,718
2,575,558

(2) By curing with crosslinking agents:
(a) Primary and secondary amines—
    Ethylene diamine
    Diethylene triamine
    Triethylene tetramine
    Dimethylamino propylamine
    Piperidine
    Metaphenylene diamine
    4,4'-methylene dianiline
    Diaminodiphenylsulfone
(b) Amides—
    Dicyandiamide
    Polyamide
(c) Organic acids—oxalic acid
(d) Phthalic anhydride
    Citraconic anhydride
    Maleic anhydride
    Hexahydrophthalic anhydride
    Pyromellitic dianhydride
    Dodecenyl succinic anhydride
    Methylated maleic acid adduct of phthalic anhydride
    Chlorendic anhydride
    Maleic acid adduct of phthalic anhydride Such resin-hardener systems are, for instance, described in the following U.S. patents:

| | |
|---|---|
| 2,324,483 | 2,717,885 |
| 2,444,333 | 2,744,845 |
| 2,500,600 | 2,760,944 |
| 2,585,115 | 2,773,048 |

Basic condensation products may also be considered as poly-epoxy bodies for the purposes of the present invention.

To the above described mixtures, plastifiers, wetting agents, etc. can be added. The preparation, use and adjustment of such epoxy-resins have been described in Henry Lee's "Epoxy-Resins," published by McGraw-Hill Book Company, Inc., 1957.

Unsaturated polyester-type resins are, for instance, described in the following publications: C. P. Vale, "The Chemistry of Unsaturated Polyester Resins," "British Plastics," September 53, pp. 327–332, U.S. Patent 2,604,-463.

They are formed by copolymerization of unsaturated polyesters, from glycols and unsaturated dibasic acids, with vinyl type monomers such as styrene, diallylphthalate, triallylcyanurate, etc. in the presence of a catalyst such as benzoyl peroxide, methyl-ethyl-ketone peroxide, cyclohexanone peroxide, etc.

The advantages of using, according to the present invention, a creped paper in combination with the above resins for the manufacture of such insulating material, especially in combination with low pressure resins, are most significant. The speed of winding the crepe paper layers is many times greater than the speed of winding according to previous methods, no pressure need be used and no elevated temperatures are required during the winding. The insulating laminated bodies can be hardened, if necessary, in a setting oven after completion of the winding operation. Therefore, smaller and several times less expensive equipment can be used than has to be used for the conventional process. Above all, according to the present invention, it is possible to completely eliminate the semi-circular or moon-shaped cracks which could always be found in the laminated bodies made with smooth papers such as kraft papers or the like.

While the laminations, according to the present invention, may be formed in many different ways, it is particularly advantageous to form the same by winding crepe paper webs or bands about a conductor or the like, or about a temporary mandrel. Thereby care has to be taken to wind as tightly as possible. Furthermore, the crepe paper should not be tensioned too strongly during the winding so that under all circumstances the wound crepe paper retains at least part of its crimping. Thereby, those crepe paper types which, due to their crimping, can be stretched by more than 50% of their original length can be tensioned more strongly than crepe paper types of lesser crimping. Furthermore, the crepe paper is to have such mechanical strength as to allow the forming of a dense roll without excessive stretching of the paper.

When it is desired to provide laminated coverings for straight members such as cylindrical members or rods, or also on multi-edged profiles, it is advantageous to use, according to the present invention, crepe paper webs having a width corresponding to the width of the body which is to be covered.

When bodies of more complicated configuration are to be covered, primarily bent members, then bands of crepe paper should be used. In cases where the thus formed coverings have to be particularly long, or particularly thick, it is important to avoid an axial dislocation of the individual windings relative to each other during subsequent impregnating or hardening.

For this purpose, it is desirable, according to the present invention, to so connect or fix the individual windings of each layer relative to each other that they cannot move in axial direction. This can be done, for instance, by adhering an adhesive tape to each layer prior to winding thereon the next following superposed layer. The adhesive tape is to extend in a direction transverse to the individual windings of the layer, preferably in the direction of the generatrix or parallel to the axis of the underlying body.

Very complicated configurations, such as, for instance, Y-shaped or T-shaped connecting members, annular members with straight rods extending therefrom and others are preferably covered with laminated, insulating bodies, according to the present invention, by combining the winding of crepe paper bands with the application of suitably cut crepe paper sheets or pieces.

It is, of course, also possible in a similar manner to superpose individual precut pieces of crepe paper upon each other and this method is preferred particularly in cases where large immovable objects are to be covered with the laminated insulating body of the present invention.

It is for instance possible to carry out the present method by pretreating creped paper with the unhardened hardenable synthetic resin by either coating the crepe paper with the resin while the latter is in liquid or paste-like condition, or by impregnating the crepe paper with the resin throughout. Thereafter, the thus-treated crepe paper sheets or layers are superposed upon each other, if desired in some cases under application of pressure and heat, and finally, the thus-formed structure is solidified by hardening of the synthetic resin. The hardening can be carried out depending on the type of resin and depending on the intended use of the object, either without application of appreciable pressure or under application of pressure and furthermore with or without application of heat. Thereby it is possible to operate without solvents in a manner known per se, for instance with epoxy resins or with cresol-formaldehyde resins or the like.

This method can also be applied when the crepe paper prior to being treated with the synthetic resin has already been pretreated with an impregnating liquid, particularly when the final product is to be used in electric apparatus. Thus, the crepe paper may be pretreated for instance with a permanently liquid or with a solidifiable dielectric material such as mineral oil, silicone oil, molten wax, thermoplasts or the like as has been more fully described in U.S. patent application Serial No. 522,735 filed July 18, 1955, now U.S. Patent 2,945,912, and entitled Laminated Body and Method of Making the Same.

It is also possible according to the present invention to form coverings which consist of two different layers or types of superposed layers, so that the inner layer of the covering may consist of a fibrous material, not necessarily crepe paper, which has been impregnated with a dielectric substance, and such inner layer is then covered with a crack-free outer layer according to the present invention, instead of being covered with and embedded in an outer cast-resin covering, consisting of so-called low-pressure resin, as has been more fully described in U.S. patent application Serial No. 436,656, filed June 14, 1954, and entitled High Voltage Insulator, now U.S. Patent 2,945,912.

It is also possible according to the present invention, and particularly advantageous when the covering is to be formed by the winding of crepe paper webs or bands about a core or the like, to first form the superposed layers of wound crepe paper, thereafter drying the thus-formed structure, preferably under a reduced pressure and subsequently impregnating the superposed crepe paper layers, preferably with a thinly liquid synthetic resin which will remain in such liquid condition for a relatively long period of time, preferably at least two hours in order to assure complete permeation and impregnation of the wound crepe paper body by the liquid resin. Certain epoxy resins such as the one which is commercially available under the trade name Araldite 6010, in combination with hardener 905, furthermore Lekutherm X50 and X60 in combination with hardener H of the firm Bayer, Leverkusen, Germany, and many others are suitable for this particular process. After completely impregnating the superposed layers of crepe paper in this manner, solidification of the impregnating resin is carried out in the manner particularly suitable for the specific impregnant used, for instance by hardening, cooling, setting etc.

The following examples are given as illustrative only of the process of the present invention, the present invention however not being limited to the specific details of the examples.

EXAMPLE 2

*Forming a Crack-Free Covering on a Straight Electrical Conductor*

A crepe paper web of 50 cm. width is wound about a cylindrical brass tube or rod having an outer diameter of 20 mm. Winding is continued until the superposed wound layers have a combined thickness of 15 mm. The winding speed is about 3 meters per minute, however if the mechanical strength of the crepe paper web and the available apparatus permits, the winding speed can be further increased.

As crepe paper, a soda crepe paper is used having 35% extensibility, a weight of 130 grams per square meter and a thickness prior to creping of 0.23 mm.

The winding apparatus is so adjusted that the crepe paper is stretched by between 10% and 15% prior to being wound. This is achieved as known by braking the storage roll of the winding apparatus. The thus-formed structure, namely the brass tube or rod with the crepe paper wound about it is introduced into a relatively narrow metal pipe, i.e., which only very slightly exceeds the diameter of 50 mm. of the wound structure. The metal pipe is tightly closed at one end, and a funnel having a minimum capacity of one liter is mounted to the other end of the metal pipe. The narrow metal pipe with the wound structure therein and the funnel mounted at the open end thereof is then placed vertically, with the funnel extending upwardly, into a vacuum oven approximately for about eight hours to dry under vacuum at a temperature of 110° C. The vacuum toward the end of the drying treatment is preferably between 0.5 and 1 mm. Hg. Without interrupting the vacuum treatment, one liter of the impregnating resin described further below and being heated to a temperature of 120° C. is quickly introduced through the funnel and thereafter, the vacuum is maintained for about another five minutes. Then, the vacuum is broken by allowing the entry of dry air into the oven. Hardening of the impregnating resin is then carried out for 12 hours at 120° C. The hardening may also be carried out in a separate hardening oven.

The impregnating resin has the following composition and is prepared as described below:

|   | Parts by weight |
|---|---|
| Araldite 6060 (Ciba Co. Inc.) (epoxide equivalent about 425, melting point about 60° C.) | 100 |
| Phthalic acid anhydride | 30 |

The Araldite 6060 is heated to 120° C., the phthalate acid anhydride molten and heated to a temperature of 130° C. and thereafter the two compositions are well mixed with each other. The mixture is used at a temperature of 120° C.

EXAMPLE 3

The covering described in Example 2 can also be produced in the following manner:

A crepe paper is used having a 50% extensibility, 4½ mils thickness, and approximate weight of 0.069 pound per square yard, and a tensile strength MD lbs./in.=9.

The crepe paper is first well dried, then it is slowly continuously passed in a manner known per se through a resin bath of the composition described below, in such a manner that the crepe paper web will remain immersed in the resin bath for a period of between two and four seconds. Excess resin adhering to the surface of the crepe paper leaving the resin bath is wiped off in known manner, and the impregnated crepe paper is then again wound into a roll. The brass tube or rod which is to be covered, is turnably mounted in a resin bath of the below described composition, and the crepe paper which has been preimpregnated as described above is wound about the brass pipe or the like while the same is submerged in the resin bath. Thus the winding is carried out in the resin bath. Winding tension is so adjusted that the crepe paper prior to being wound about the brass rod is stretched by about 25%. In this manner it is possible to obtain completely crack-free and practically air-free wound laminated bodies without the application of a vacuum. The finished structure is then removed from the resin bath and for about 24 hours slowly hardened at 50° C. Final hardening is completed for about two hours at 100° C.

COMPOSITION OF RESIN BATH

|   | Parts by weight |
|---|---|
| Araldite 6010 (a liquid epoxy resin, epoxide equivalent about 195) | 100 |
| Araldite hardener 905 | 100 |
| Accelerator 905 | 1 |

All of the above components of the resin bath are made by Ciba Co. Inc.

EXAMPLE 4

*Forming a Laminated Insulating Covering About a Torus Such as the Annular Portion of a Dry Insulated High Voltage Transformer for 100 Kv.*

While the straight extension of the primary conductor can for instance be insulated as described in Example 2, the torus portion consisting for instance of aluminum and having an outer diameter of 400 mm. and a thickness of 70 mm. is insulated by wrapping around the same a band of crepe paper having a width of 3 cm. until the thickness of the thus-formed superposed layers of crepe paper on the outside of the metal body amounts to 20 mm.

A soda crepe paper band is used having a 30% extensibility, a weight of 80 grams per square meter and prior to creping a thickness of 0.15 mm.

The band is spirally wound about the torus, for instance by hand, in such a manner that the crepe paper band is thereby stretched to the extent of between 10% and 15%. The pitch is so chosen that overlapping to the extent of about one-half of the width of the band occurs.

The thus paper-covered torus is dried under vacuum of between 0.5 and 1 mm. Hg for eight hours at a temperature of between 20° and 30° C. For this purpose, the torus is placed into a suitable vessel within the vacuum chamber. Thereafter, a liquid impregnating resin of the composition described below is added so as to well cover the torus. About five minutes later the vacuum is broken with dried air, and after waiting a further hour, the impregnated torus is removed from the resin bath and is allowed to stand at room temperature for several hours. Thereafter, the resin in the torus covering is further hardened for four hours at a temperature of 50° C.

The resin mixture used in the present example has the following composition:

|   | Parts by weight |
|---|---|
| Paraplex P-43 (Rohm and Haas, Philadelphia) | 100 |
| Styrene monomer | 20 |
| Lupersol DDM (Lucidol Co., Buffalo) | 0.5 |
| Co-metal in the form of Nuodex cobalt naphthenate (Nuodex Prod. Inc., Elizabeth, N.J.) | 0.01 |

EXAMPLE 5

*Forming a Wound Laminated Insulating Covering According to Example 1 but Including Current Conducting Inserts (Condenser Control Layers)*

While winding crepe paper as described in Example 2, rectangular condenser foils are wound together with the crepe paper at regular distances for instance after each 1.5 mm. thickness of superposed crepe paper layers. The rectangular condenser foils consist of aluminum foil having a thickness of 0.005 mm. The arrangement or distribution of the condenser foils is controlled in known manner by electrotechnical calculations depending on the specific apparatus and its intended use.

Impregnation and hardening is carried out as described in Example 2. The thus-formed laminated covering has a dielectrical strength transverse to the wound crepe paper of between 600 and 800 kv./cm. measured between spheres of 20 mm. diameter under oil immersed, at a distance of between 1 mm. and 2 mm.

EXAMPLE 6

*For an Insulated Laminated Covering on a U-Shaped Rod*

A U-shaped bent copper rod having a rectangular cross section of 20 x 50 mm. having two arms of one meter length each and a radius of curvature of about 500 mm. is covered with an insulating laminated layer of about 20 mm. thickness, in the following manner:

Rolls of crepe paper bands of the type described in Example 4 and having an outer diameter of about 100 mm. are impregnated under a vacuum of between 5 mm. and 10 mm. Hg with the below described impregnating resin mixture. Immediately thereafter, the thus preimpregnated bands are spirally wound about the copper rod so as to form layers thereon. The pitch is again so chosen that each successive layer overlaps the band of the preceding layer by 50%. Winding is carried out under such tension that the crepe paper band is stretched by about 10% prior to being wound about the copper rod. It is essential that during the winding sufficient excess resin is present between the preceding crepe paper band layer and the susperposed layer being formed so that no air is entrapped between the windings. Only as many rolls of crepe paper band are impregnated as will be immediately used up, so that the winding will be carried out well within the pot life of the resin which amounts to only about two hours. Thus rolls which have been impregnated more than about two hours prior to use have to be discarded.

Hardening is then carried out at about 30° C. for a period of about 12 hours.

The impregnating resin mixture is composed of:

| | Parts by weight |
|---|---|
| Bakelite ERL-3794 | 100 |
| Triethylene-tetramine | 10 |

EXAMPLE 7

(*A Modification of Example 2*)

Laminated insulating bodies according to Example 2 may also be formed with the following impregnating mixture:

20 parts by weight 2,4-toluene di-isocyanate (Narconate 100, National Aniline)
80 parts by weight anhydrous castor oil having a low acid number
Traces of cobalt naphthenate Hardening is carried out for ten hours at 120° C. The mixture is formed by first adding to the castor oil only a small portion, up to 20%, of the di-isocyanate, subjecting the thus-formed mixture to a reduced pressure of about 1 mm. Hg and subsequently adding the balance of the di-isocyanate.

In this case, all operations have to be carried out in a water-free atmosphere since the above mixture would be attacked by moisture.

EXAMPLE 8

*Condenser Lead-In (Bushing)*

A layer of crepe paper band having a thickness of 30 mm. is wound dry onto a brass tube having an outer diameter of 100 mm. and a length of 1,500 mm. The width of the crepe paper band is 50 mm. The crepe paper quality and the manner of winding are similar to what has been shown in Example 4.

After winding each individual layer, a 2 mm. wide strip of adhesive tape is applied onto diametrically opposite portions of the circumference of the layer, the strip of adhesive tape extending along the generatrix of the layer along the entire length of the tube. Immediately thereafter, the next superposed layer of the crepe paper band is wound about the adhesive taped-fixed preceding layer and thereafter two new adhesive tapes are affixed prior to forming the next layer of crepe paper.

After forming crepe paper layers of a combined thickness of 22 mm., a 30% alcoholic suspension of graphite is applied in order to form a current conducting condenser layer. This is repeated after each 2 mm. of crepe paper layer thickness. (See in this connection Example 5.)

The finished structure is mounted into a tightly fitting mold somewhat similar to what is described in Example 2 and is dried therein for 24 hours under a reduced pressure of 0.5 mm. Hg and at a temperature of 80° C., and thereafter, while still under vacuum, impregnated with the mixture described below, in the manner described in Example 2. Hardening is carried out for 14 hours at 120° C.

The impregnating mixture is composed as follows:

| | Parts by weight |
|---|---|
| Araldite 6010 | 100 |
| Dodecenyl-succinic anhydride | 130 |
| Benzyldimethylamine | 0.5 |

The adhesive of the adhesive tape used to fix the individual layers of crepe paper is composed of:

100 parts by weight Araldite 6010
10 parts by weight triethylenetetramine
100 parts by weight of powdered quartz of a fineness of about 300 mesh

EXAMPLE 9

A laminated wound body according to Example 2 can also be impregnated in the following manner.

The crepe paper is dried for about 8 hours at 80° C. under a reduced pressure of 0.5 mm. Hg and is then impregnated with a mixture having a temperature of 80° C. and composed as follows:

| | Parts by weight |
|---|---|
| N-vinyl carbazole monomer (Polectron monomer) | 100 |
| Morpholine | 0.02 |
| Benzoyl peroxide | 1 |

Hardening is carried out for 12 hours at 120° C.

EXAMPLE 10

A cylindrical crepe paper roll as formed according to Example 2 can also be impregnated by well drying the crepe paper roll at 105° C. for a period of 12 hours, cooling in dry air and then introducing the roll into the container or mold described in Example 2. At the lowermost portion of the mold, an inlet passage of about 10 mm. diameter is formed and a pipe is arranged leading from the inlet passage in the bottom of the mold to the upper level of the funnel arrangement on top of the mold. The impregnating mixture described below is slowly introduced through the pipe into the lowermost portion of the mold and will slowly rise therein until it reaches the funnel on top of the mold. Thereby air will be pushed upward by the rising liquid resin and will thus be removed from the laminated structure.

Hardening, i.e., polymerizing is carried out for 48 hours at 50° C. and thereafter for 4 hours at 85° C. in a heating bath provided with cooling and heating means in order to quickly remove the reaction heat produced during the polymerization.

The impregnating mixture consists of:

100 parts by weight of styrene monomer including a few parts per million of tertiary butyl catechol inhibitor
0.5 part by weight divinyl benzene
0.25 parts by weight diisopropyl peroxi-dicarbonate (Columbia-Southern Chemical Corp.)

Figure 2:
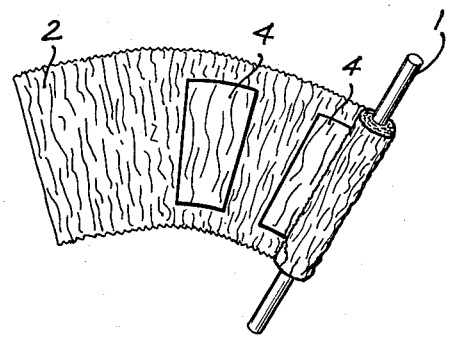

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary view, partially in cross section of an electrical conductor covered with the laminated body of the present invention; and FIG. 2 is a perspective view schematically showing the winding of an insulating covering according to the present invention about a current-conducting member, prior to application of the synthetic resin.

Referring now to the drawing, and particularly to FIG. 1, a cylindrical conductor 1 is shown about which a crepe paper band 2 has been wound so as to form a plurality of layers whereby the bands of each layer overlap about one-half of the width of the bands of the preceding layer. The crimping of the crepe paper is shown in somewhat exaggerated manner and similarly the cavities between the crepe paper layers are also exergerated in size. These cavities are filled with a hardened resin 3 which also penetrates into the crepe paper band. An interposed aluminum foil 4 is shown such as is described in Example 5.

FIG. 2 shows the winding of crepe paper band 2 about cylindrical conductor 1, and the interposition of aluminum foils 4.

The method and product of the present invention are particularly advantageous in connection with high voltage insulating installations of various types wherein the insulating is to be accomplished by a covering. It is particularly advantageous in connection with objects of large dimensions which it was not possible up to now to insulate in a dry manner. Thus, it is now possible according to the present invention to dry insulate for instance busbars, connecting conduits of high voltage apparatus and particularly also curved conduits, circular transformers, transformers with U-shaped primary conductors, insulating cylinders, insulated winding supports for transformers, power transmission rods and shafts for high voltage switches, etc.

It has been found that very advantageous results are obtained by producing according to the present invention high voltage lead-throughs (Bushings) which are to be controlled by means of conductive layers. In the case of condenser lead-throughs (bushings), the complete absence of cracks according to the present invention is particularly important.

Since such conductive condenser layers must be capable of adhering to the crepe paper substantially without forming cavities, it has been found important to make these conductive layers of very thin conductive material, for instance of very thin metal foils such as aluminum foils having a thickness less than 0.01 mm. It is possible to use for the same purpose also conductive lacquers such as graphite lacquers, conductive silver-containing substances highly dispersed copper suspension or the like which partially penetrate into the crepe paper. For the same purpose, metalized or graphitized crepe paper can be used advantageously and it is possible to produce in similar manner, high voltage roll-type condensers.

It will be understood that each of the elements described above, or two or more together, may also find a useful application in other types of laminated bodies differing from the types described above.

While the invention has been illustrated and described as embodied in an insulating laminated covering for electrical apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of forming a rigid crack-free laminated covering on a solid body, comprising the steps of elastically stretching crepe paper which due to crimping is elastic and has a predetermined maximum extensibility, said stretching being carried out so as to stretch said crepe paper only to a fraction of its maximum extensibility; applying under tension to at least a portion of the surface of a solid body a plurality of superposed layers of said elastically stretched crepe paper; impregnating said layers of elastically stretched crepe paper with a synthetic hardenable resin so as to completely fill free spaces between said layers, said steps of applying said layers and impregnating the same being carried out in any desired sequence so as to obtain a solid body covered with a plurality of layers of elastically stretched crepe paper impregnated with a hardenable synthetic resin; and thereafter hardening said hardenable resin, thereby forming a rigid crack-free laminated covering consisting essentially of layers of crepe paper and hardened synthetic resin penetrating and adhereing said layers to each other and filling said spaces between the same.

2. In a method according to claim 1, the step of applying an electrically conductive material to at least one of said superposed layers of elastically stretched crepe paper.

3. In a method according to claim 1, the step of interposing metal foils between at least two of said superposed layers of elastically stretched crepe paper.

4. In a method according to claim 1, the step of interposing aluminum foils having a thickness of up to 0.01 mm. between at least two of said superposed layers of elastically stretched crepe paper.

5. In a method according to claim 1, the step of applying an electrically conductive lacquer to at least portions of said superposed layers of elastically stretched crepe paper.

6. A method according to claim 1, in which at least portions of said elastically stretched crepe paper are metalized.

7. A method of forming a rigid crack-free laminated covering on a solid body, comprising the steps of elastically stretching crepe paper, which due to crimping is elastic and has a predetermined maximum extensibility, to only a fraction of its maximum extensibility; applying under tension to at least a portion of the surface of a solid body a plurality of superposed layers of crepe paper; supplying to said elastically stretched layers a synthetic hardenable resin free of solvents and adapted to be irreversibly hardened without giving off gaseous constituents, so as to substantially fill free spaces in and between said layers, said steps of applying said layers and supplying said resin being carried out in any desired sequence so as to obtain a solid body covered with a plurality of layers of elastically stretched crepe paper impregnated with a hardenable synthetic resin; and thereafter hardening said hardenable resin, thereby forming a rigid crack-free laminated covering consisting essentially of layers of crepe paper and of said hardened synthetic resin filling said spaces and adhering said layers to each other.

8. A method of forming a rigid crack-free laminated covering on a solid body, comprising the steps of elastically stretching crepe paper, which due to crimping is elastic and has a predetermined maximum extensibility, to only a fraction of its maximum extensibility; applying under tension to at least a portion of the surface of a solid body a plurality of superposed layers of said elastically stretched crepe paper; supplying to said elastically stretched layers a hardenable epoxy resin so as to substantially fill free spaces in and between said layers, said steps of applying said layers and supplying said resin being carried out in any desired sequence so as to obtain a solid body covered with a plurality of layers of elastically stretched crepe paper impregnated with a hardenable synthetic resin; and thereafter hardening said hardenable resin, thereby forming a rigid crack-free laminated covering consisting essentially of layers of crepe paper and of said hardened epoxy resin filling said spaces and adhering said layers to each other.

9. A method of forming a rigid crack-free laminated covering on a solid body, comprising the steps of elastically stretching crepe paper, which due to crimping is elastic and has a predetermined maximum extensibility, to only a fraction of its maximum extensibility; applying under tension to at least a portion of the surface of a solid body a plurality of superposed layers of said elastically stretched crepe paper; supplying to said elastically stretched layers a hardenable epoxy resin having a pot life of at least two hours so as to substantially fill free spaces in and between said layers, said steps of applying said layers and supplying said resin being carried out in any desired sequence so as to obtain a solid body covered with a plurality of layers of elastically stretched crepe paper impregnated with a hardenable synthetic resin; and thereafter hardening said hardenable resin, thereby forming a rigid crack-free laminated covering consisting essentially of layers of crepe paper and of said hardened epoxy resin filling said spaces and adhereing said layers to each other.

10. A method of forming a rigid completely laminated covering on a solid body, comprising the steps of elastically stretching crepe paper which due to crimping is elastic and has a predetermined maximum extensibility, said stretching being carried out so as to stretch said crepe paper only to a fraction of its maximum extensibility; applying under tension to at least a portion of the surface of a solid body a plurality of superposed layers of said elastically stretched crepe paper; supplying to said elastically stretched layers a synthetic hardenable polymerizable unsaturated monomeric or pre-polymerised substance so as to substantially fill free spaces in and between said layers, said steps of applying said layers and supplying said substance being carried out in any desired sequence so as to obtain a solid body covered with a plurality of layers of elastically stretched crepe paper impregnated with a hardenable synthetic resin; and thereafter hardening said hardenable substance, thereby forming a rigid crack-free laminated covering consisting essentially of layers of crepe paper and of a hardened substance filling said spaces and adhering said layers to each other.

11. A method of forming a rigid crack-free laminated covering on a solid body, comprising the steps of elastically stretching crepe paper which due to crimping is elastic and has a predetermined maximum extensibility, said stretching being carried out so as to stretch said crepe paper only to a fraction of its maximum extensibility; applying under tension to at least a portion of the surface of a solid body a plurality of superposed layers of said elastically stretched crepe paper; supplying to said elastically stretched layers a thermoplastic hardenable resin so as to substantially fill free spaces in and between said layers, said steps of applying said layers and supplying said resin being carried out in any desired sequence so as to obtain a solid body covered with a plurality of layers of elastically stretched crepe paper impregnated with a hardenable synthetic resin; and thereafter hardening said hardenable resin, thereby forming a rigid crack-free laminated covering consisting essentially of layers of crepe paper and of said hardened thermoplastic resin filling said spaces and adhering said layers to each other.

12. A method of forming a rigid crack-free laminated covering on a solid body comprising the steps of elastically stretching crepe paper which due to crimping is elastic and has a predetermined maximum extensibility, said stretching being carried out in such a manner as to stretch said crepe paper only to a fraction of its maximum extensibility; tightly winding about at least a portion of the surface of a solid body a plurality of superposed layers of said elastically stretched crepe paper; supplying to said layers a synthetic hardenable resin so as to substantially fill free spaces in and between said layers, said steps of applying aid layers and supplying said resin being carried out in any desired sequence; and thereafter hardening said hardenable resin, thereby forming a rigid crack-free laminated covering consisting essentially of layers of crepe paper and of said hardened synthetic resin filling said spaces and adhering said layers to each other.

13. A method of forming a rigid crack-free laminated covering on a solid body, comprising the steps of elastically stretching crepe paper, which due to crimping is elastic and has a predetermined maximum extensibility, to only a fraction of its maximum extensibility; applying under tension to at least a portion of the surface of a solid body a web of said elastically stretched crepe paper so as to form a plurality of superposed crepe paper layers; supplying to said elastically stretched layers a synthetic hardenable resin so as to substantially fill free spaces in and between said layers, said steps of applying said layers and supplying said resin being carried out in any desired sequence so as to obtain a solid body covered with a plurality of layers of elastically stretched crepe paper impregnated with a hardenable synthetic resin; and thereafter hardening said hardenable resin, thereby forming a rigid crack-free laminated covering consisting essentially of layers of crepe paper and of said hardened synthetic resin filling said spaces and adhering said layers to each other.

14. A method of forming a rigid laminated covering on a solid body comprising the steps of elastically stretching crepe paper which due to crimping is elastic and has a predetermined maximum extensibility, said stretching being carried out so as to stretch said crepe paper only to a fraction of its maximum extensibility; winding under tension about said solid body a band of said elastically stretched crepe paper so as to form a first continuous layer of crepe paper on said solid body; fixing the windings of said layer by adhering thereto a strip of adhesive material extending in a direction transverse to said windings; similarly forming a second continuous layer of said elastically stretched crepe paper superposed upon said first continuous layer, and repeating said steps of forming and fixing superposed layers of said elastically stretched crepe paper until the thus formed plurality of superposed layers reaches a predetermined thickness; supplying to said band of elastically stretched crepe paper a synthetic hardenable resin so as to substantially fill free spaces in and between said layers, said steps of winding said band of crepe paper and supplying said resin being carried out in any desired sequence so as to obtain a solid body covered with a plurality of layers of elasticaly stretched crepe paper impregnated with a hardenable synthetic resin; and thereafter hardening said hardenable resin, thereby forming a rigid crack-free laminated covering consisting essentially of layers of crepe paper and of said hardened synthetic resin filling said spaces and adhering said layers to each other.

15. A method of forming a rigid crack-free laminated covering on a solid body, comprising the steps of elastically stretching crepe paper, which due to crimping is elastic and has a predetermined maximum extensibility, to only a fraction of its maximum extensibility; applying to the thus elastically stretched crepe paper a synthetic hardenable resin so as to substantially completely coat and at least partially penetrate said crepe paper with said hardenable resin; thereafter applying under tension a plurality of superposed layers of thus-treated elastically stretched crepe paper to the surface of a solid body so as to form thereon a laminated covering consisting essentially of said layers of crepe paper so as to obtain a solid body covered with a plurality of layers of elastically stretched crepe paper impregnated with a hardenable synthetic resin and said hardenable resin at least partially penetrating said elastically stretched layers and interposed therebetween; and thereafter hardening said hardenable resin, thereby forming a rigid hardened, substantially crack-free laminated covering.

16. A method of forming a rigid crack-free laminated covering on a solid body, comprising the steps of elastically stretching crepe paper which due to crimping is elastic and has a predetermined maximum extensibility to only a fraction of its maximum extensibility; impregnating and coating said elastically stretched crepe paper with a synthetic hardenable resin; thereafter applying under tension a plurality of superposed layers of thus-treated elastically stretched crepe paper to the surface of a solid body so as to form thereon a laminated covering consisting essentially of said elastically stretched layers of crepe paper and said hardenable resin interposed therebetween; and thereafter hardening said hardenable resin, thereby forming a hardened, substantially crack-free rigid laminated covering.

17. A method of forming a rigid crack-free laminated covering on a solid body, comprising the steps of elastically stretching crepe paper, which due to crimping is elastic and has a predetermined maximum extensibility, to only a fraction of its maximum extensibility; applying under tension to at least a portion of the surface of a solid body a plurality of superposed layers of said elastically stretched crepe paper; vacuum-drying the thus-formed at least partially crepe paper-covered body; thereafter supplying to said elastically stretched layers of crepe paper about said solid body a synthetic hardenable resin so as to substantially fill free spaces in and between said layers so as to obtain a solid body covered with a plurality of layers of elastically stretched crepe paper impregnated with a hardenable synthetic resin; and thereafter hardening said hardenable resin, thereby forming a rigid crack-free laminated covering consisting essentially of layers of crepe paper and of said hardened synthetic resin filling said spaces and adhering said layers to each other.

18. A method of forming a rigid crack-free laminated covering on a solid body, comprising the steps of elastically stretching crepe paper, which due to crimping is elastic and has a predetermined maximum extensibility, to only a fraction of its maximum extensibility; applying under tension to at least a portion of the surface of a solid body a plurality of superposed layers of said elastically stretched crepe paper; vacuum-drying the thus-formed at least partially crepe paper-covered body; thereafter supplying to said elastically stretched layers of crepe paper about said solid body while maintaining a partial vacuum a synthetic hardenable resin so as to substantially fill free spaces in and between said layers so as to obtain a solid body covered with a plurality of layers of elastically stretched crepe paper impregnated with a hardenable synthetic resin; and thereafter hardening said hardenable resin, thereby forming a rigid crack-free laminated covering consisting essentially of elastically stretched layers of crepe paper and of said hardened synthetic resin filling said spaces and adhering said layers to each other.

19. For use in electrical apparatus, a rigid laminated body having insulating properties, comprising, in combination, a plurality of elastically tensioned layers of crepe paper elastically stretched only to a fraction of its maximum extensibility superposed upon each other; and a solid hardened synthetic resin surrounding each of said layers of crepe paper penetrating the same and filling all interstices thereof, said hardened resin adhering to said layers of tensioned crepe paper so as to form a coherent rigid crack-free laminated body.

20. For use in an electrical apparatus, in combination, a solid electrical conductor; and a rigid crack-free laminated body having insulating properties at least partially covering said conductor, said laminated body comprising a plurality of elastically tensioned layers of crepe paper elastically stretched only to a fraction of its maximum extensibility superposed upon each other, and a solid hardened synthetic resin surrounding each of said elastically stretched layers of crepe paper penetrating the same and filling all the interstices thereof, said hardened resin adhering to said layers of elastically stretched crepe paper so as to form a coherent crack-free rigid laminated body on said conductor.

References Cited in the file of this patent

UNITED STATES PATENTS

| | | |
|---|---|---|
| 2,015,714 | Del Mar | Oct. 1, 1935 |
| 2,222,639 | Pirk | Nov. 26, 1940 |
| 2,287,201 | Scott | June 23, 1942 |
| 2,305,903 | Scott et al. | Dec. 22, 1942 |
| 2,359,544 | Samilli et al. | Oct. 3, 1944 |
| 2,607,822 | Crandall | Aug. 19, 1952 |
| 2,607,823 | Camilli et al. | Aug. 19, 1952 |
| 2,607,824 | Camilli et al. | Aug. 19, 1952 |

FOREIGN PATENTS

| | | |
|---|---|---|
| 565,617 | Great Britain | Nov. 17, 1944 |
| 727,960 | Great Britain | Apr. 13, 1955 |